United States Patent [19]

Jensen

[11] Patent Number: 5,022,139
[45] Date of Patent: Jun. 11, 1991

[54] METHOD OF INSERTING A STATOR WINDING INTO A STATOR

[75] Inventor: Niels D. Jensen, Bjerringbro, Denmark

[73] Assignee: Grundfos International A/S, Bjerringbro, Fed. Rep. of Germany

[21] Appl. No.: 549,630

[22] Filed: Jul. 6, 1990

Related U.S. Application Data

[63] Continuation of Ser. No. 350,946, May 12, 1989, abandoned.

[30] Foreign Application Priority Data

Jun. 16, 1988 [DK] Denmark ................................ 2672

[51] Int. Cl.⁵ .......................................... H02K 15/06
[52] U.S. Cl. ...................................... 29/596; 29/606; 29/736
[58] Field of Search .................. 29/732, 736, 596, 606, 29/734

[56] References Cited

U.S. PATENT DOCUMENTS 2,796,543  7/1956  Dunn .
3,742,596  7/1973  Smith et al. .

FOREIGN PATENT DOCUMENTS 2045243  9/1970  Fed. Rep. of Germany .
2015829  2/1979  United Kingdom .

Primary Examiner—Carl E. Hall
Attorney, Agent, or Firm—Michael N. Meller

[57] ABSTRACT

A method for winding a stator that may be used for single-phase and three-phase motors. The stator windings are spread across several slots of the stator so that some of the slots receive winding portions of several phase windings. The windings are made by using a mandrel that has step-formed portions with a plurality of winding surfaces. Some of the winding surfaces lie in the same plane so as to permit the windings wound thereon to fit properly into the slots of the stator.

1 Claim, 11 Drawing Sheets

TOOLING ADJUSTMENT

METHOD OF INSERTING A STATOR WINDING INTO A STATOR

This application is a continuation of application Ser. No. 350,946, filed May 12, 1989, now abandoned.

FIELD OF THE INVENTION

The invention relates to a method of inserting a stator winding into a stator comprising an equal number of slots, such as sixteen slots.

BACKGROUND ART

Such a stator is frequently used in monophase motors.

SUMMARY OF THE INVENTION

The object of the invention is to render it possible to use such a stator in three-phase motors, and said object is achieved according to the invention by some of the windings being spread across several slots in such a manner that some of the slots receive winding portions of several phase windings a mandrel being used, which is shaped in such a manner that one side of the first third of a phase winding on the mandrel is placed like one side of a second third of the winding, while the opposite side of the second third of the winding is placed like the opposite side of the third third of the winding.

In this manner an automatic insertion is allowed of a three-phase winding into a stator comprising sixteen slots.

BRIEF DESCRIPTION OF THE DRAWINGS

The invention is described in greater detail below with reference to the accompanying drawings, in which.

DESCRIPTION OF PREFERRED EMBODIMENTS

By one of the known devices for inserting the stator winding in an electromotor (a statomat manufactured by the company Fickert Spezial Maschinen GmbH und Co. KG), the stator is inserted on the guide bars towards the supporting bars by means of a holding device as soon as prefabricated groups of coils have been spread across some supporting and guiding bars. The supporting bars comprise a narrow abutment surface extending in tangential direction and abutting the addendum The abutment surface is of a width which is almost twice the thickness of the slot insulation larger than the width of the tooth face. A recess is provided behind the abutment surface, said recess receiving the bent rims of the slot insulation in such a manner that to a minimum said rims obstruct both the penetration of the winding wire when the insertion head is inserted through the stator bore and the penetration of the cover strips kept in guides in the supporting bars and inserted by means of the insertion bars.

Figure 1:
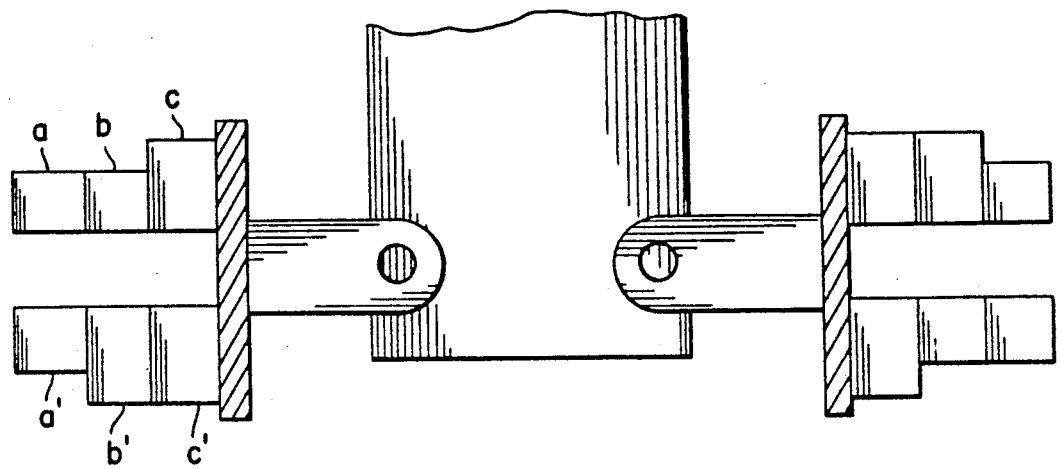
FIG. 1 illustrates some mandrels supporting the coils during the coiling procedure.
Figure 2:
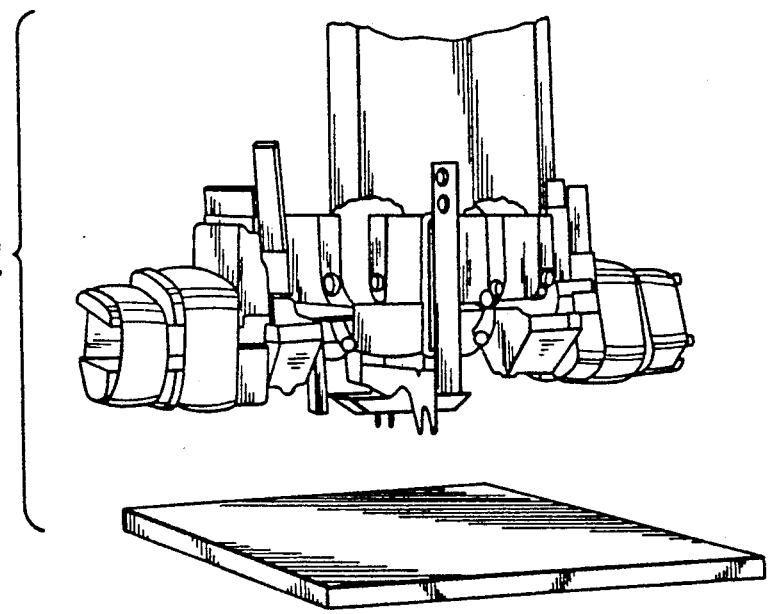
FIG. 2 illustrates the mandrels with coils coiled there-on, FIG. 3 illustrates how the coils are transferred to a slotted coil carrier (inserter tool)
Figure 3:
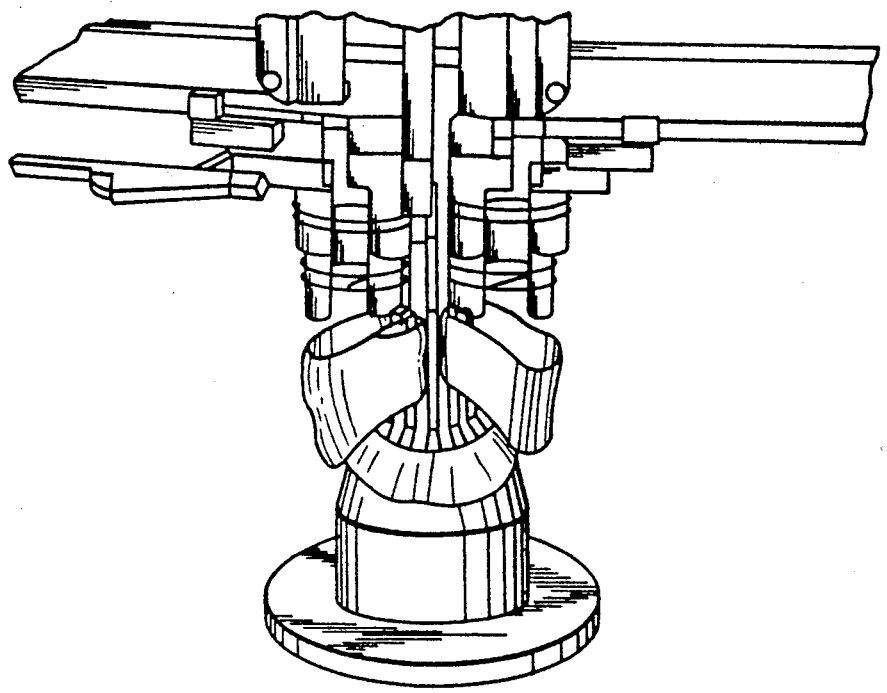
Figure 4:
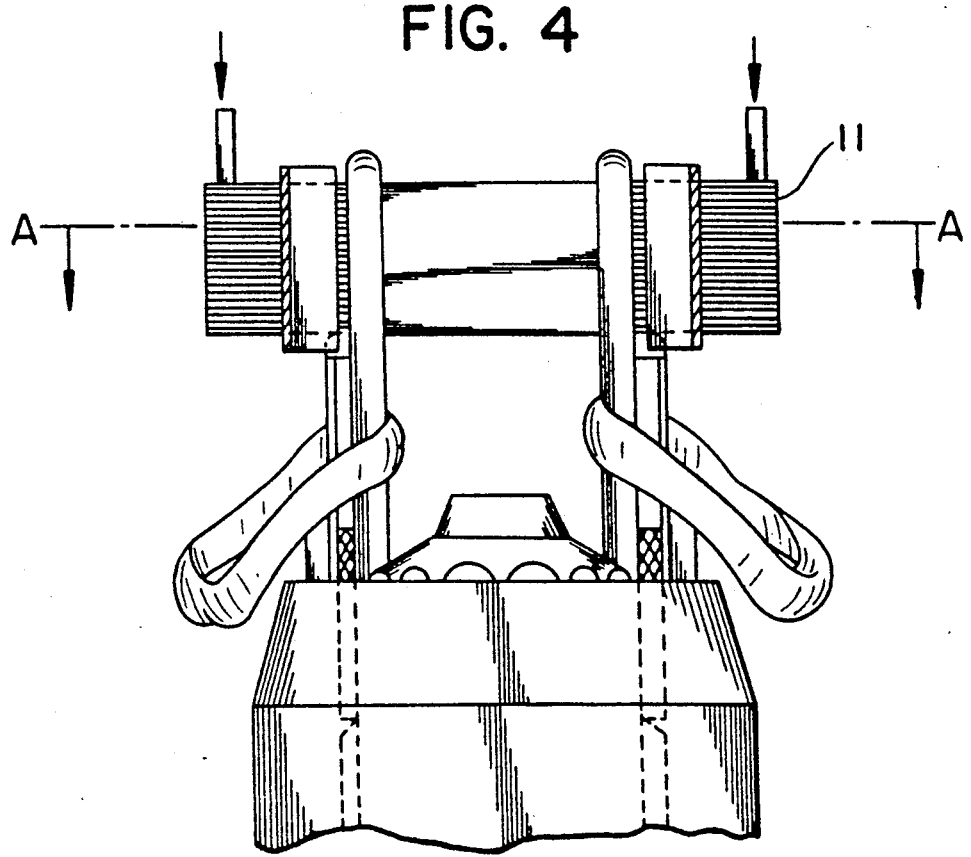
FIG. 4 illustrates how the coils coiled up are transferred to the slots of a stator.
Figure 5:
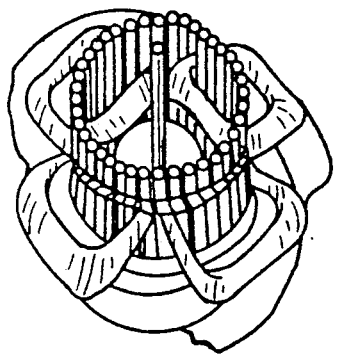
FIG. 5 illustrates a slotted coil carrier for the insertion of the coil portions into the slots, FIG. 6 an unfolded stator winding for a three-phase, bipolar motor, where the stator winding is spread across sixteen slots.

The mandrels according to the invention appear from FIG. 1. Each mandrel is provided with three winding surfaces a, a', b, b', c, c', about which the coil portions can be coiled, cf. FIG. 2. Subsequently, the mandrels are turned downwards, cf. FIG. 3, into a vertical position above a slotted coil holder. cf. FIG. 5. The two portions of each mandrel are then approached one another in such a manner that the coils fall into the slots of the coil holder. Subsequently, the mandrels are removed and a stator 11 provided with slots is placed on the coil holder, cf. FIG. 4, whereafter the coils can be inserted into the slots of the stator by means of an additional mandrel.

Figure 6:
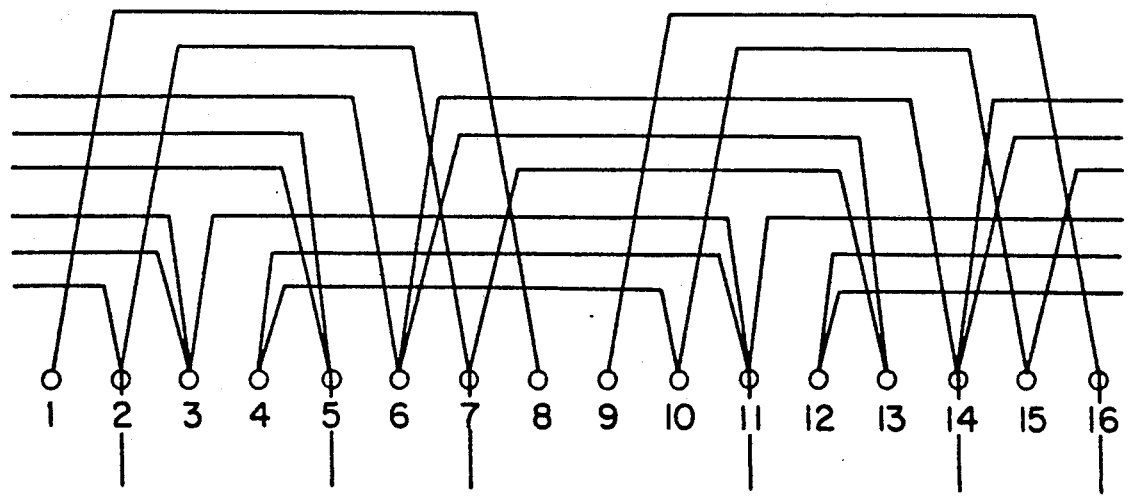

One of the objects of the invention is to render it possible to use a stator comprising sixteen slots in a bipolar, three-phase motor. This object is according to the invention achieved by some of the windings being spread across several slots in such a manner that some of the slots receive winding portions of several phase windings, cf. FIG. 6. FIG. 6 illustrates how the first phase winding is spread across the first, the second, the seventh, and the eighth slot whereas the second phase winding is spread across the third, the fourth, and the tenth, and the eleventh slot, and the third phase winding is spread across the eleventh, the twelfth, the second, and the third slot. The spreading of the stator winding is achieved by means of the mandrel of FIG. 1, said mandrel comprising three winding surfaces about which the coil portions are coiled before they are inserted into the longitudinal slots of the coil holder of FIG. 5. As far as two of the phase windings are concerned the following applies: One side of the first third of a phase winding on the mandrel is placed like one side of the second third of the winding, whereas the opposite side of the second third of the winding is placed like the opposite side of the third third of the winding.

Each phase is coiled up separately and inserted into the inserter, and when all three phases have been transferred to the inserter the stator is mounted on said inserter. Subsequently all three phases are inserted simultaneously into the stator.

In this manner it is according to the invention rendered possible to insert the coils automatically although they are to be spread in a slightly wry manner.

The coil inserting machine can for instance be a Pease Windamatic of the type EGNC-8-III.

Figure 7:
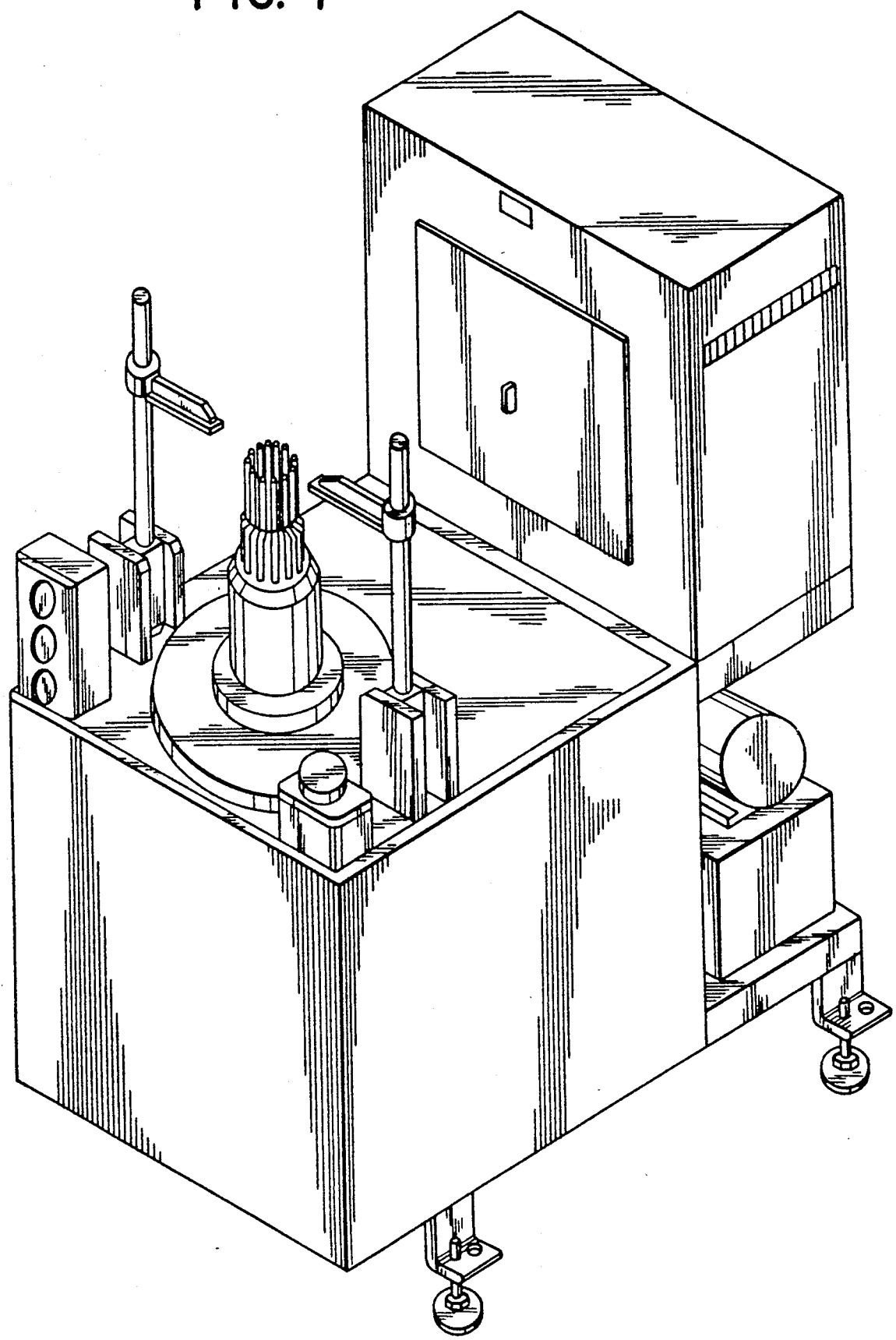
FIGS. 7 to 13 illustrate the coil inserting machine.
Figure 8:
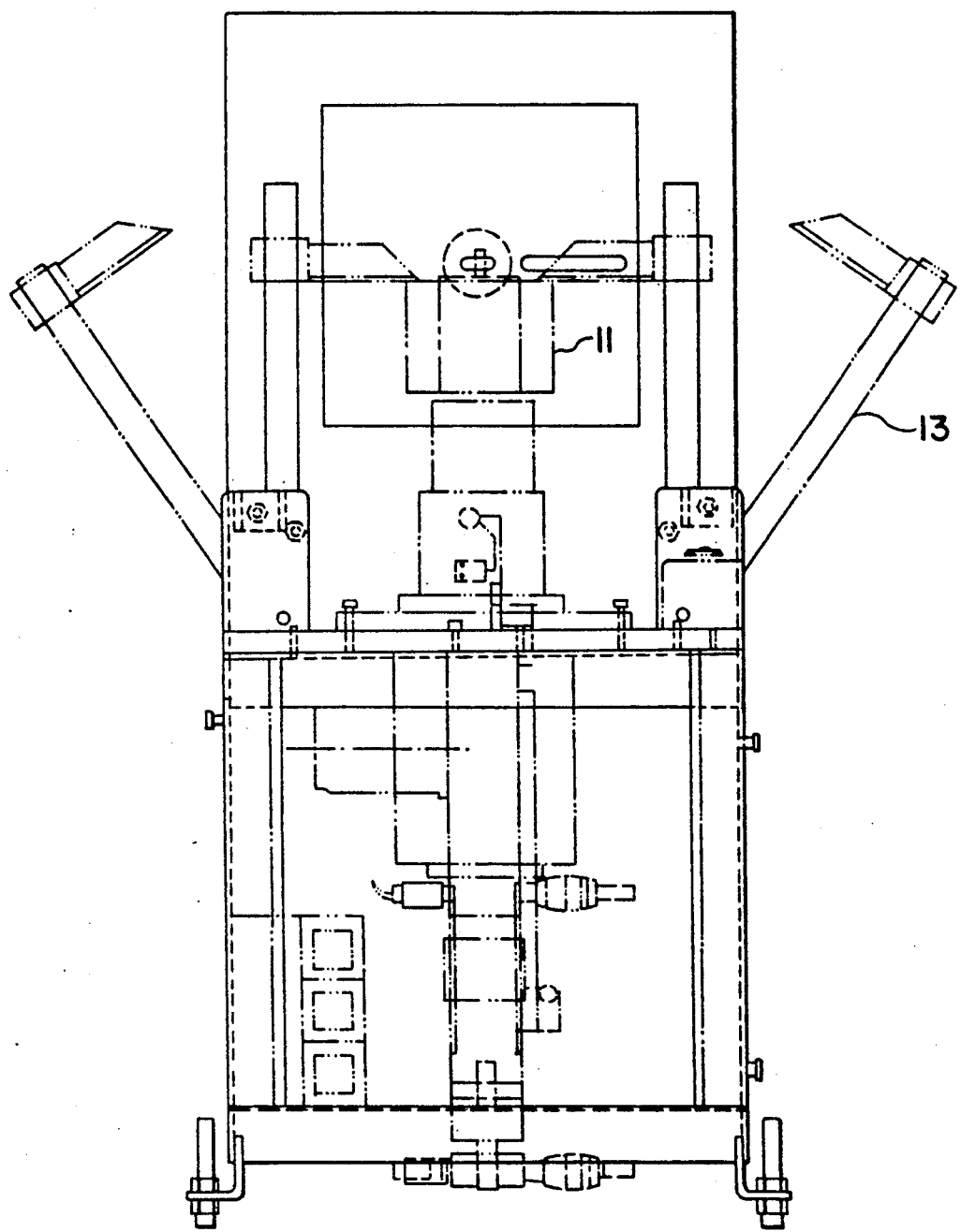
Figure 9:
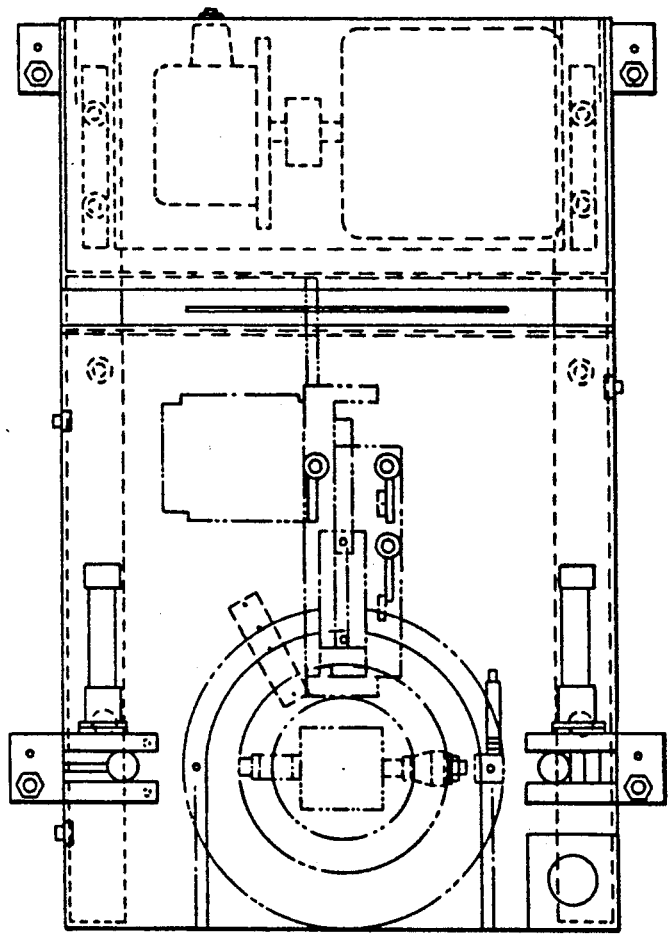
Figure 10:
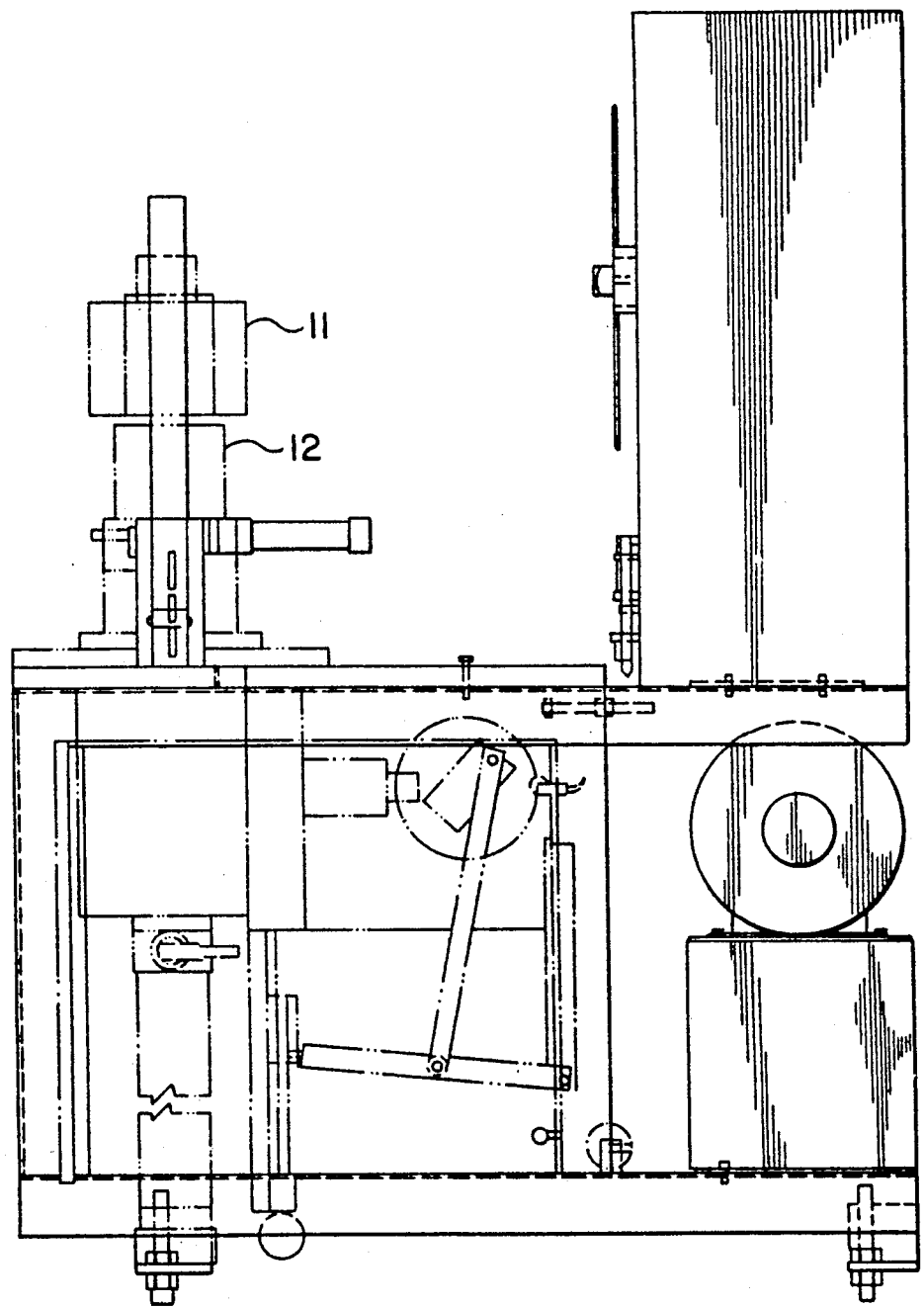
Figure 11:
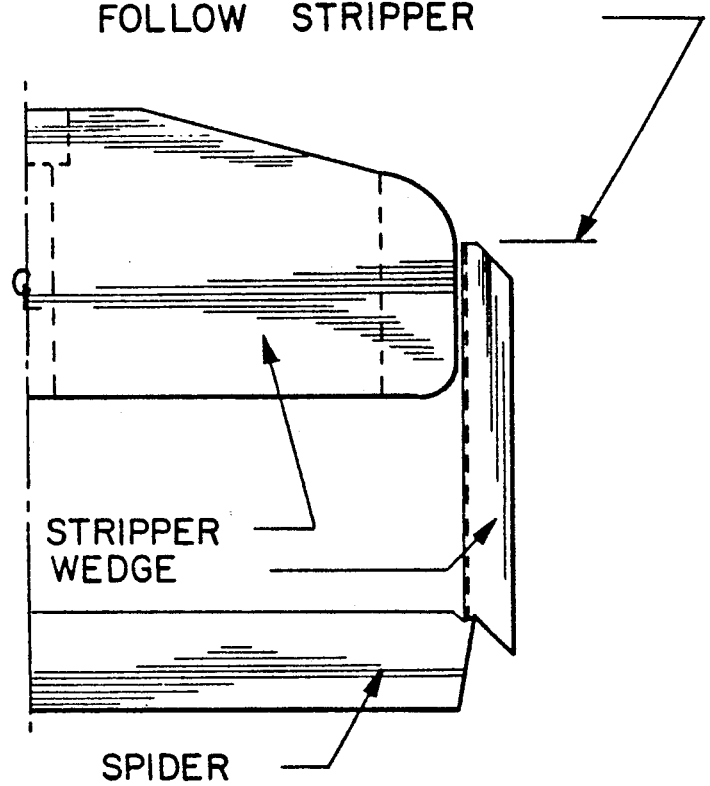
Figure 12:
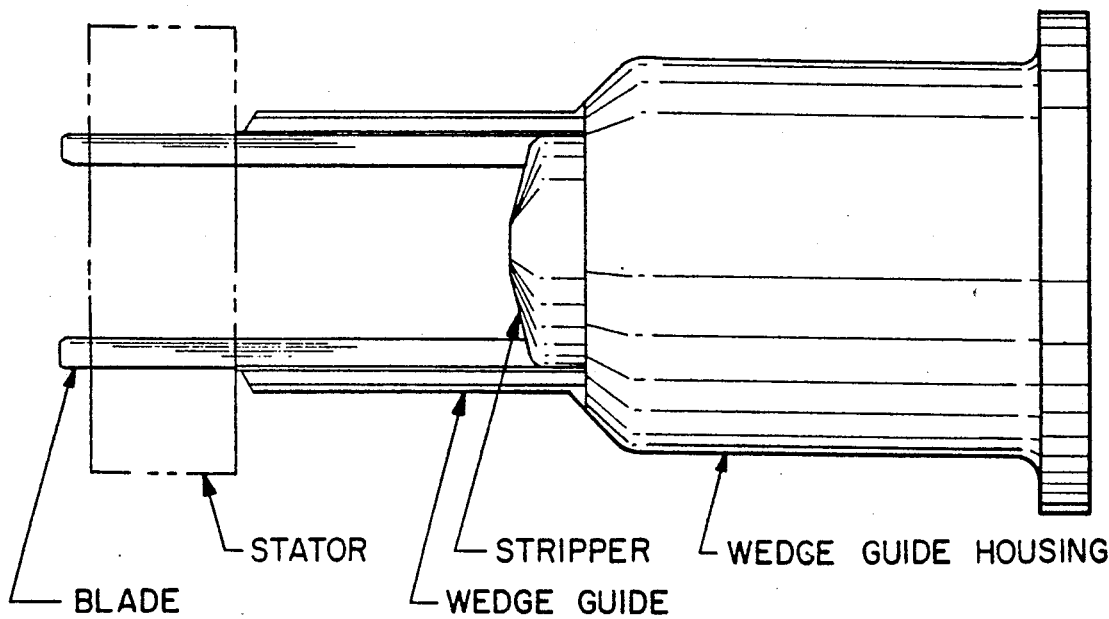
Figure 12:
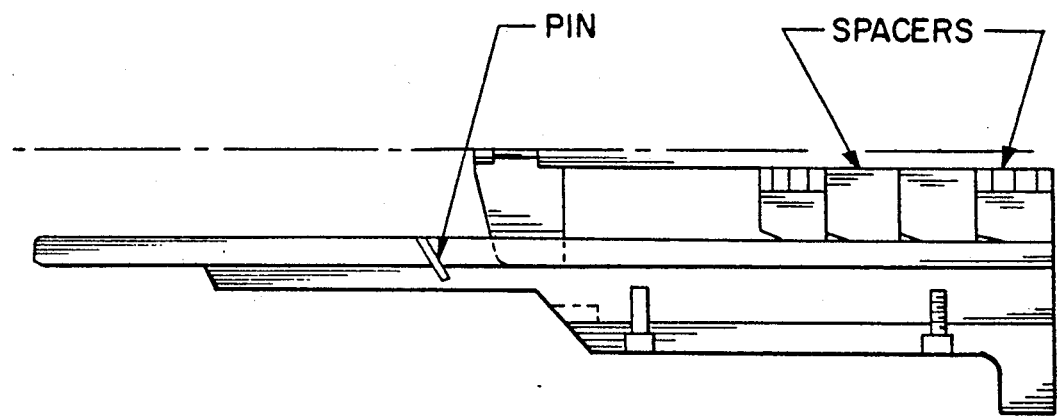
Figure 13:
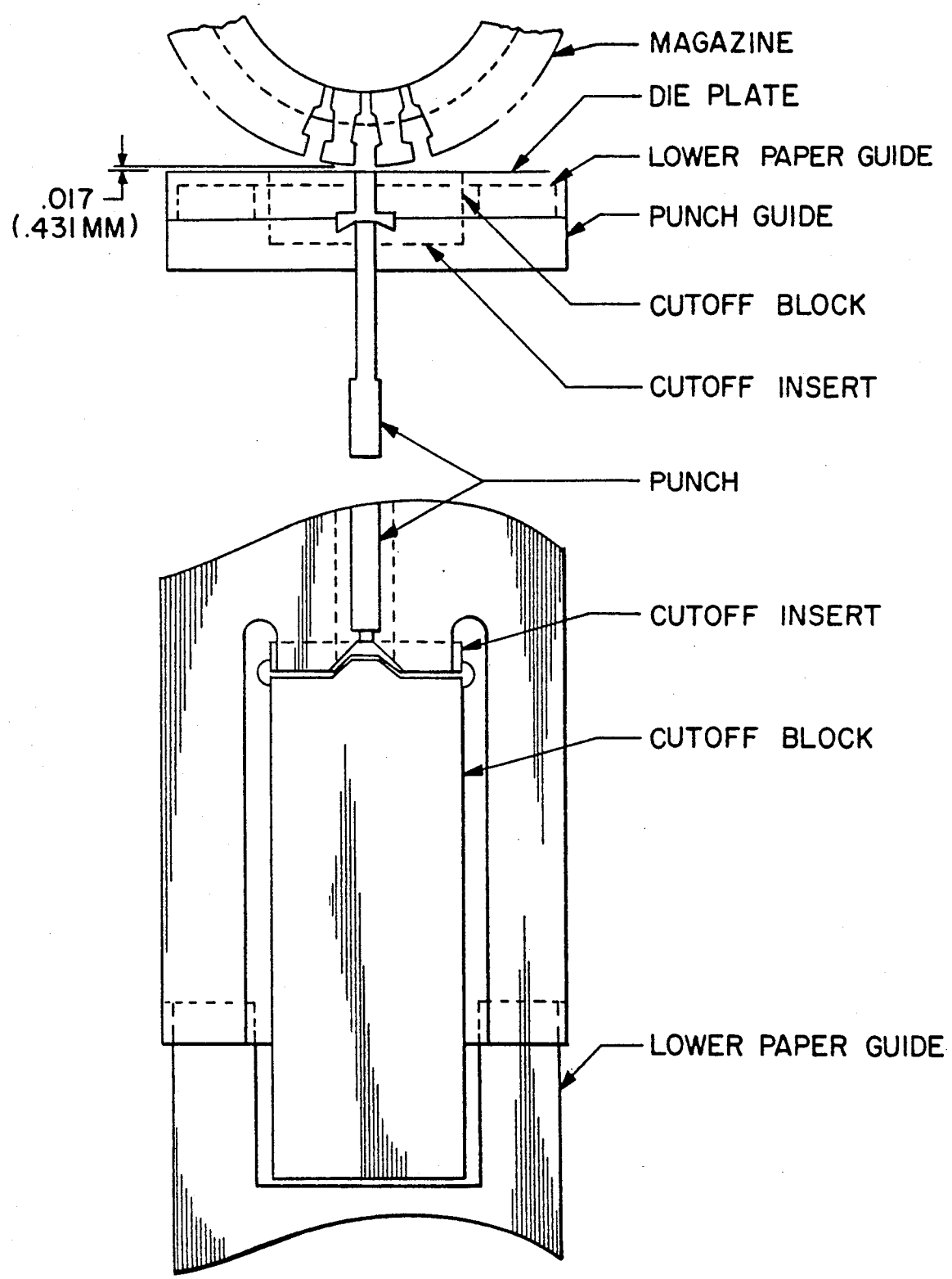
Figure 14:
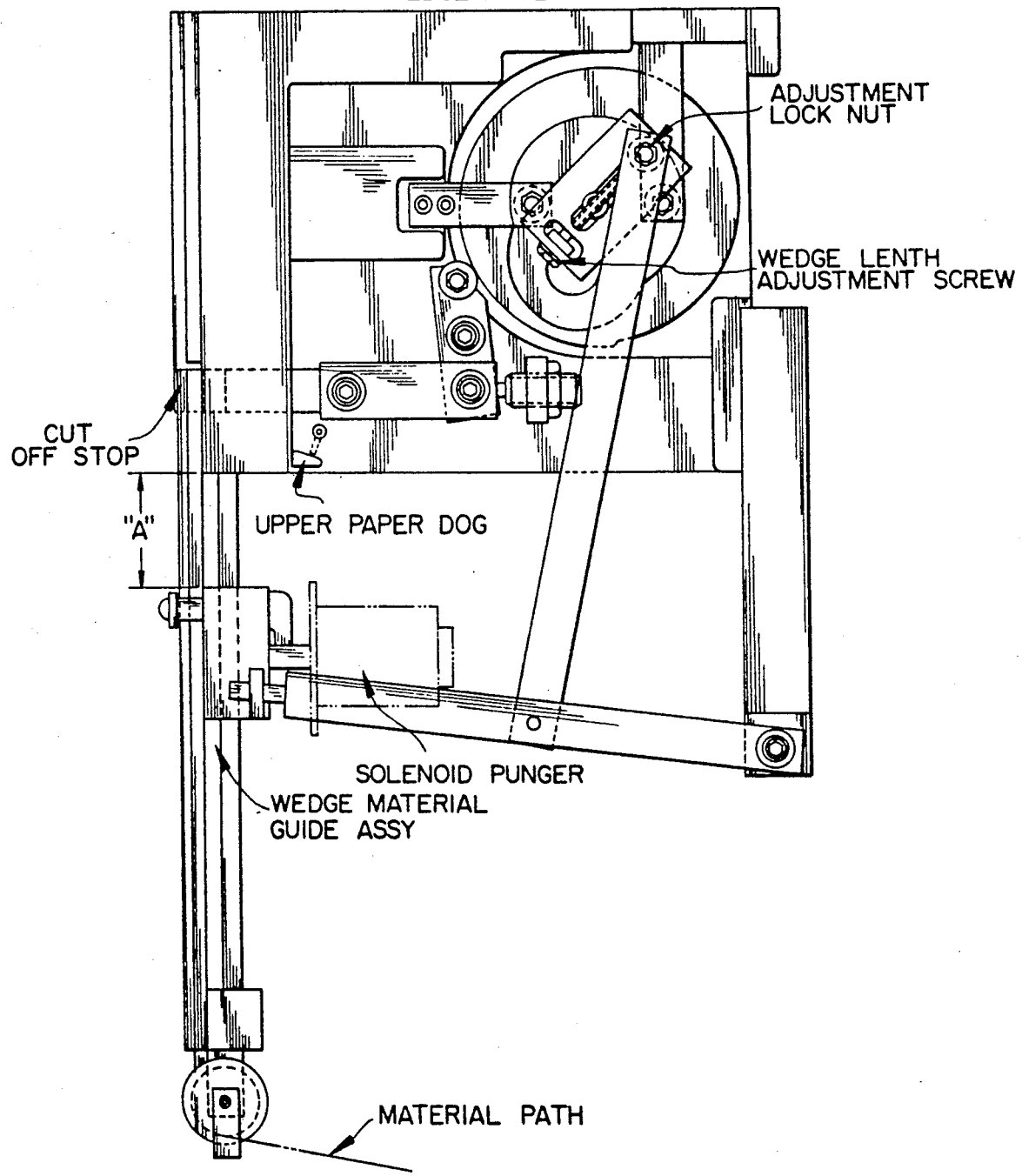
FIG. 14 illustrates the wedge maker.

The coil inserting machine, as designed by Essex Group, has three basic functions, viz. the making of wedges; the insertion of wedges; and the insertion of precoiled coils into a wide range of multi-slot stator types. The coil inserting machine is best understood by having a general knowledge of its basic components which are listed below, cf. FIGS. 7. 8, and 9.

The coil inserting machine, i.e the coil inserter, is completely hydraulicly operated. Hydraulic power pack supplies oil pressure (to 1000 P.S.I.) to the various cylinders and motors used in the machine. Solenoid operated valves are used to control direction of oil flow.

The wedge maker is a hydraulic, motor-driven, mechanically timed mechanism which cuts to length and forms wedges. The mechanism is located directly behind the tooling and situated so that the formed wedges are transferred into the wedge magazine after having been cut to length.

The term "coil insertion" means the transfer of a group or groups of precoiled coils of wire from the stator bore into the stator slots via a confined, predetermined route. The confined, predetermined route is established by the wire guide blades which fit the stator bore and protect the coils of wire against damage from the stator tangs as the wire is transferred from the stator bore into the stator slots. Coiled coils are placed over and through the wire guide blades so that each coil leg is confined between two adjacent wire guide blades. Thus a three coil step pole having a distribution of 1 to 12, 2 to 11 and 3 to 10 (bipolar, 24 slot stator) comprises six coil legs (two legs for each coil step) and is spread across corresponding wire guide blades so that one end of each coil is inside the circle. The coils are then pulled downward, i.e. into the slots formed by the wire guide blades. With the coils in place, a stator alignment tool is placed in position. This tool is used for preventing damage to the wire guide blades during the charging of the stator. The above presents also a method of checking the stator for proper dimension, throat openings, and alignment. A stator 11 is then placed on the tooling and the clamps are manually closed. The stator 11 is now ready for insertion of coils. A linear movement imparted to the ends of the coils inside the wire guide blade circle forces the coils to move into the stator 11. During this movement, the coil legs are moved up to the slots formed by the wire guide blades.

The coils are pushed out of the slots formed by the wire guide blades by the part of the tooling which is referred to as the "stripper". The stripper comprises tangs fitting into slots, and the coil legs rest on top of said tangs before and during their inward movement. As a consequence thereof the stripper forces the coil legs into the stator slots as it moves. At the completely extended position of the stripper, all the coil legs have been forced into their respective stator slots over the top end of the wire guide blades.

The bottom coil ends are outside the wire guide blades because they have never been inside the circle formed by the wire guide blades. The wire has now been inserted into the stator slots.

After a stator has been inserted with coils and wedges, the ram returns to its starting position, and the wedge making cycle starts automatically. Wedges are made of a di-electric material and are stored in the wedge guides for insertion into the stator as a simultaneous operation with the insertion of the coils.

The di-electric material, slit to a proper width and coiled on rolls is placed on the inserting machine. The material is fed from the roll to a cut-off mechanism cutting a wedge of a predetermined length. Immediately after the cutting, the wedge is forced through a die plate by a punch. The punch also forces the wedge into the wedge machine portion of the tooling located directly below the die plate. The magazine insures that the shape of the wedge is maintained. Each wedge is in a separate slot of the magazine (i.e 24 slot stator comprises a 24 slot magazine). A hitch feed mechanism controlling paper length, the cut-off mechanism, the punch, and the magazine index are all mechanically linked together so that the operations follow in proper sequence.

Wedges are formed in the magazine and stored in the wedge guides. When changing the wedge pattern or the wedge length, the machine must be in the "set-up" mode, and the ram is actuated twice (to remove stored wedges and clear the magazine, and thereafter clear the stored wedges). After the desired change, the ram is to be actuated again to store the new wedges in the wedge guides.

Assuming that wedges have been stored in the wedge guides and that the coil loading by the operator has been accomplished, and the combination wire guide and stator alignment tool has been positioned, a stator 11 is placed on the inserter tooling 12 (wire guide blades). Now the operator positions the clamping bars, and the stator is fixed. When the stator clamps 13 are locked, detection devices signal the main ram into operation.

The rear spider begins to push the wedges out of the wedge magazine and into the wedge guide section of the tooling, and the front spiders pushes the stored wedges. When the wedges have reached a predetermined point, the stripper begins to push the coils up the wire guide slots and into the stator 11. Thus the time lag between wedge pushing and coil pushing allows the wedges to reach a position such that they "catch up" with the wire and enter the stator slots immediately behind the wire or coils, cf. FIG. 3.

The coils and wedges advance up the wire guides until the ram reaches the end of its stroke. Now all the coil legs have been stripped from the wire guides and wedges have been inserted and stored. The stripper then retracts to its down position, and the stator clamps unlock. The stator is now ready for removal from the tooling.

I claim:

1. A method of inserting a stator winding into a stator having an even number of slots wherein each phase of the stator winding has a plurality of coils and each coil has a plurality of turns and some of the windings are spread across a plurality of slots such that some of the slots receive winding portions of several different coils of each phase comprising the steps of winding a coil including several coil portions about a mandrel having at least three step-formed portions, each of said step-formed portions having a plurality of winding surfaces lying along the same curved surface, inserting said coil portions into the longitudinal slots of a coil holder and inserting said coil portions into said stator from said coil holder.

* * * * *

UNITED STATES PATENT AND TRADEMARK OFFICE
CERTIFICATE OF CORRECTION

PATENT NO. : 5,022,139
DATED : June 11, 1991
INVENTOR(S) : JENSEN

It is certified that error appears in the above-identified patent and that said Letters Patent is hereby corrected as shown below:

Title Page, left column:

Amend item [73] to read:

-- Grundfos International A/S,

Bjerringbro, Denmark--

Signed and Sealed this

Sixteenth Day of February, 1993

Attest:

STEPHEN G. KUNIN

Attesting Officer

Acting Commissioner of Patents and Trademarks